INVENTOR
SIDNEY SPERLING
ATTORNEY

INVENTOR.
SIDNEY SPERLING
BY
ATTORNEY 3,194,947

AUTOMATIC SELECTOR FOR POOLED ANALOG COMPUTER COMPONENTS IN A MULTI-COMPUTER INSTALLATION

Sidney Sperling, Southampton, Pa., assignor, by mesne assignments, to the United States of America as represented by the Secretary of the Navy Filed July 15, 1960, Ser. No. 43,251
9 Claims. (Cl. 235—150)

Figure 1A:
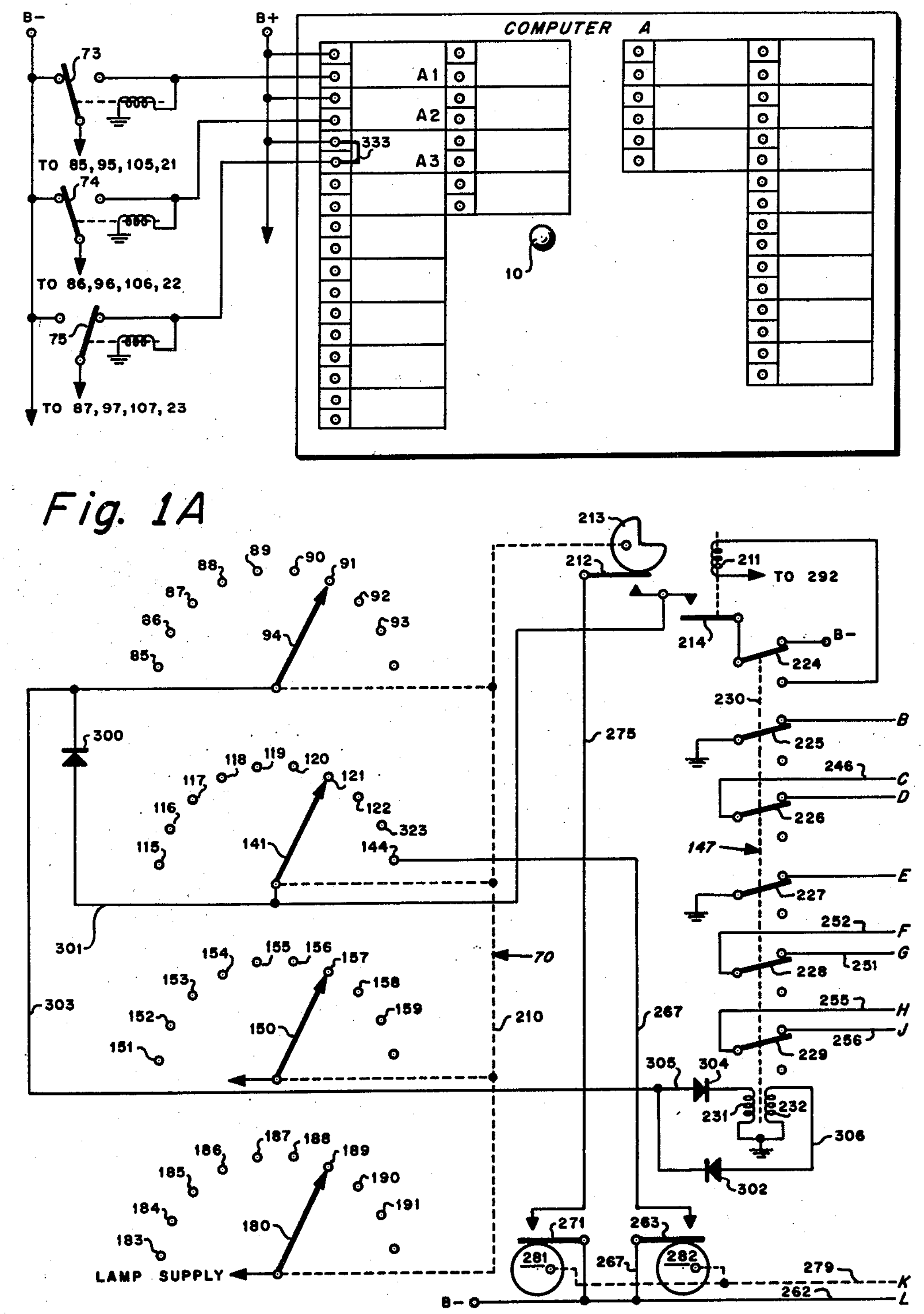

This invention relates in general to signaling, and has more particular reference to a signaling system for indicating the nonavailability or availability of stores.

One of the principal objects of this invention is the provision of a novel automatic selector apparatus for stores which may be pooled analog computer components in a multi-computer installation.

Another object of the invention is the provision of an automatic selector apparatus, as set forth in the preceding object, having means for signaling the availability of each of the stores.

Yet another object of the invention is the provision of the automatic selector apparatus referred to, capable of accepting a query for an analog computer component or other store and providing either the terminals of that component at predetermined positions on a prepatch panel or signaling that the component is not available.

A still further object of the invention is the provision of an automatic selector apparatus having means for plugging a patch cord into two query holes on a prepatch panel and thereby signaling a request for a selected store at that position on the prepatch panel and wherein electrical terminals of the selected store shall be immediately made automatically available at that position, and if the store is unavailable, there shall be a positive indication of that fact, preferably by the energization of an alarm lamp.

Another object of the invention is the provision of the apparatus referred to wherein store allocations will be restricted to the queried position and the selected store shall not be brought out to more than one location on the prepatch panel so as to provide location isolation of one query position for one store.

A further object of the invention is the provision of the apparatus referred to wherein each store shall remain assigned until released from the selected position and release shall be effected by removing the patch cord, means being provided to prevent power failure from releasing or changing the selection of any store.

Figure 2:
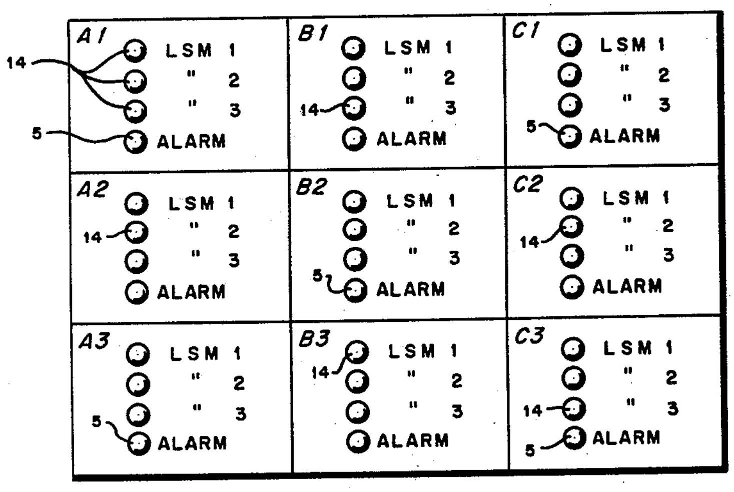
Figure 3:
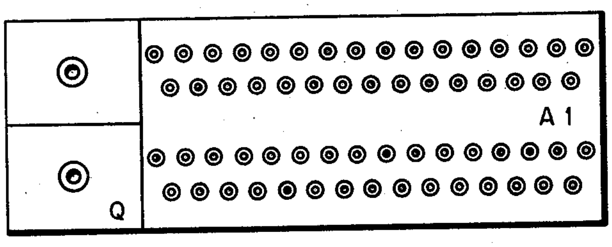

The invention further resides in certain novel features of construction, combinations and arrangements of parts, and further objects and advantages of the invention will be apparent to those skilled in the art to which it pertains from the following description of the preferred embodiment thereof described with reference to the accompanying drawings, which form a part of the specification, and wherein the same reference characters represent corresponding parts throughout the several views, and in which:

FIGS. 1A, 1B, 1C and 1D together form a simplified electromechanical diagram of an automatic selector apparatus embodying the invention;

FIG. 2 illustrates an indicator panel on a maintenance console for showing where and how many of a particular store are being used, and where a certain store is being demanded; and FIG. 3 is an enlarged detailed view of a typical prepatch panel section.

It is to be understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to the drawings, auxiliary section prepatch panels for three analog computers A, B, and C are shown for the purpose of illustrating the manner in which the invention was actually carried out. Although analog computers may comprise a large number of different components or equipments which may be referred to as stores, only a few will be referred to for the purpose of describing the invention. For example, selectors may be provided for stores, such as resolvers, various types of recorders, noise generators, ten-card linear servo multipliers, plotting boards, and switches.

Figure 1B:
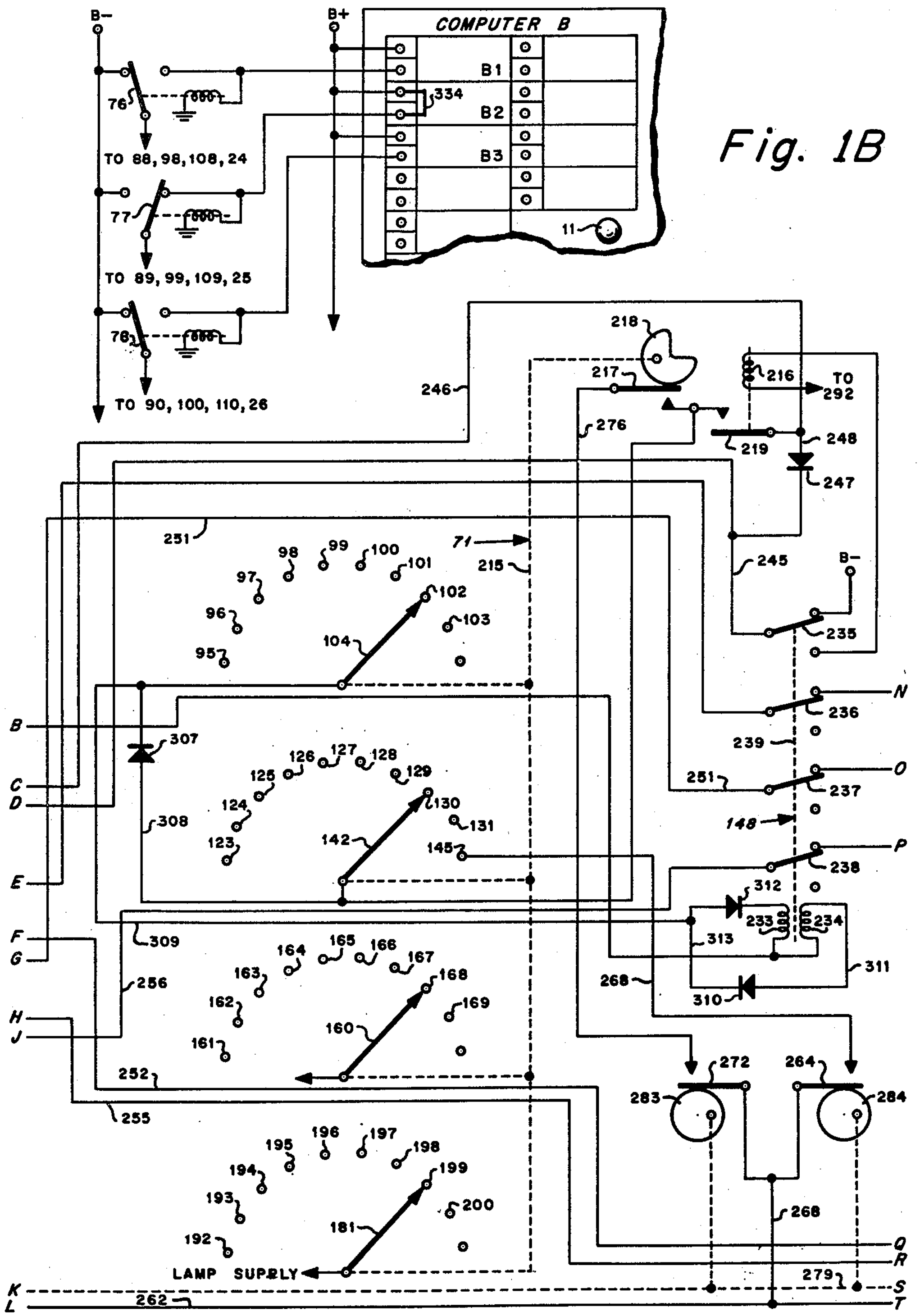
Figure 1C:
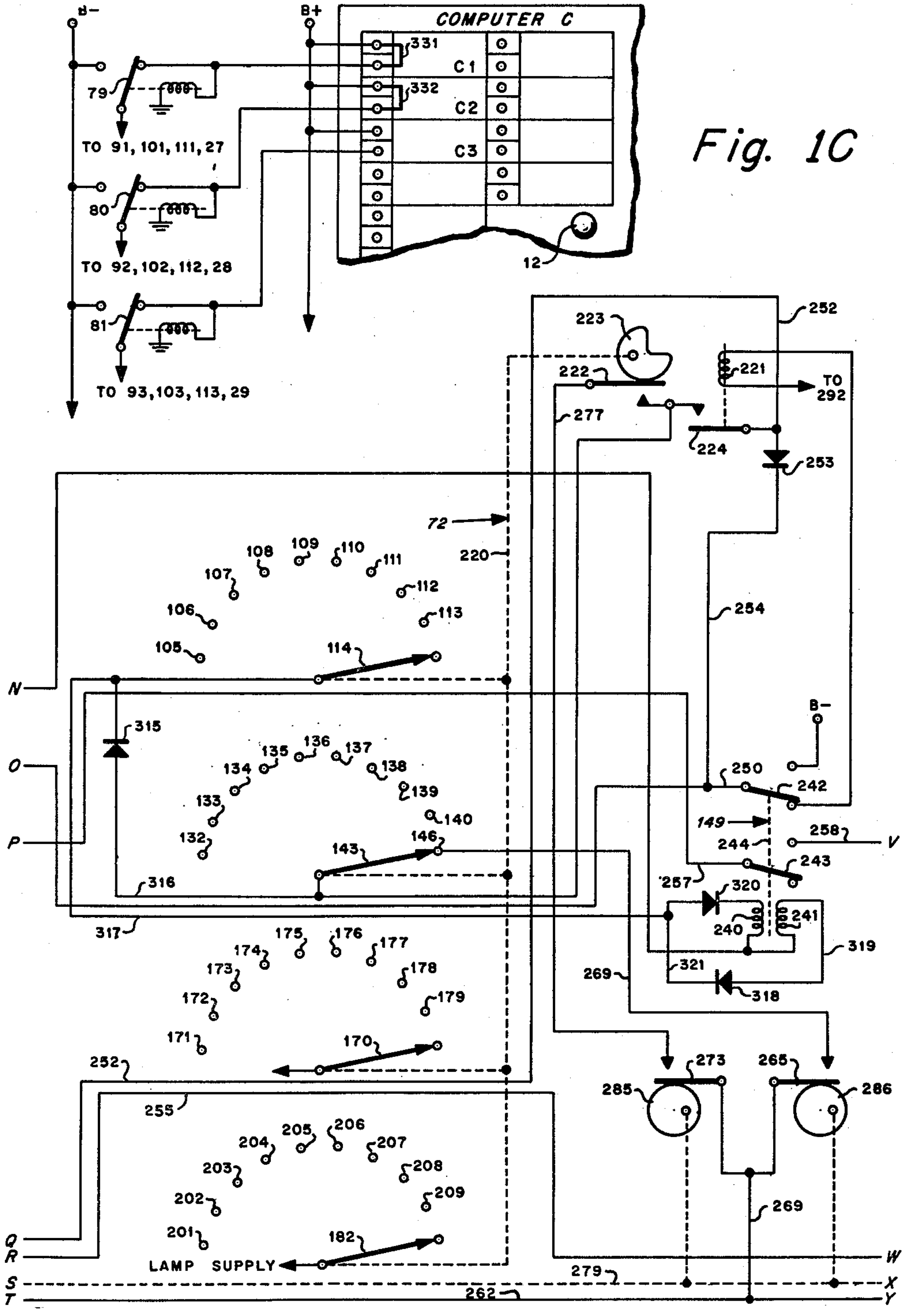

For the purpose of this description, an equipment group consisting of three ten-card linear servo multipliers LSM #1, #2, #3 may be selectively connected into any one of the prepatch panels of computers A, B, C. Referring to FIGS. 1A, 1B, 1C, the computer A prepatch panel has equipment positions A1, A2, A3 and an alarm light 10. The computer B prepatch panel has equipment positions B1, B2, B3 and an alarm light 11. The computer C prepatch panel has equipment positions C1, C2, C3 and an alarm light 12. FIG. 2 shows that part of an indicator panel on a maintenance console which relates to linear servo multipliers on each of the prepatch panels of computers A, B, C. It is preferable that the maintenance console be located at some central location away from individual computer consoles A, B, C as the maintenance console is a troubleshooting tool that allows a faulty computing element to be quickly located. Lights 14 on the maintenance console indicate where each computing element in the auxiliary sections of computers A, B, C has been allocated at any time. Also, alarm lights 5 indicate the location of the first alarm or first unanswered request for equipment. The lights 5 are connected in a conventional manner to alarm indicator contacts in an alarm rotary selector switch, indicated generally by the reference numeral 15. The switch 15 has two control levels. The first control level has ten contacts 21, 22, 23, 24, 25, 26, 27, 28, 29, 30 adapted to be contacted or scanned by a contact arm 31 and are respectively allocated to linear servo multipliers in prepatch panel sections A1, A2, A3, B1, B2, B3, C1, C2, C3 and a home position to be described.

The second control level of the switch 15 has a set of ten feedback contacts 32, 33, 34, 35, 36, 37, 38, 39, 40, 41 adapted to be sequentially scanned by a contact arm 42. The function of the feedback switch portion will be described later. Another set of ten contacts 43, 44, 45, 46, 47, 48, 49, 50, 51, 52 are adapted to be scanned by a contact arm 53 for respectively energizing the alarm lights 5 in the maintenance console sections A1, A2, A3, B1, B2, B3, C1, C2, C3 with the last contact 52 being provided as a dummy home contact.

Each multiplier has thirty-one computer component interconnection terminals, FIG. 3, which are arranged in two rows in rectangular sections A1, A2, A3 of computer A, rectangular sections B1, B2, B3 of computer B, and sections C1, C2, C3 of computer C, FIGS. 1A, 1B, 1C, respectively. The multiplier terminals must be switched upon query by means of two vertically arranged query holes, each pair of query holes are located in a section Q provided for each of the sections A1, A2, A3, B1, B2, B3, C1, C2, C3. The query holes are used for selecting equipment in the auxiliary sections of computers A, B, C in the multiple computer installation.

Alarm indicator lights 10, 11, 12 in the prepatch panels of computers A, B, C are lighted when a query cannot be filled because all equipment of a given type, such as all three linear servo multipliers, have been assigned. Accordingly, another set of ten contacts 54, 55, 56, 57, 58, 59, 60, 61, 62, 63 are provided in the switch 15 for energizing alarm lights 10, 11, 12 in computers A, B, C when scanned by a contact arm 64. The contacts 57, 58, 59 are wired to the light 11. The contacts 60, 61, 62 are wired to the light 12. The contact arms 53 and 64 are wired to an alarm lamp power supply. All of the contact arms 31, 42, 53, 64 are fixed to a single shaft means 65 for operation by a solenoid 66 via a suitable conventional motion translating mechanism, not shown. The switch 15 also has an interrupter switch contact 67 and an off-normal switch contact 68 adapted to be intermittently closed by a cam 69 fixed to the rotatable shaft means 65, FIG. 10.

In addition to the rotary selector switch 15, there are three similarly constructed and operated rotary selector switches, indicated generally by the reference numerals 70, 71, 72, for the auxiliary section prepatch panels of computers A, B, C, respectively, FIGS. 1A, 1B, 1C, respectively assigned to LSM's #1, #2, #3.

Referring to computers A, B, C, each of the upper prepatch holes of each pair in the query sections Q is electrically connected to a B+ power supply of preferably 24 volts direct current. By inserting a jumper wire, referred to herein as a patch cord, in a pair of query holes, a B+ voltage is allowed to appear at corresponding positions on the upper two control levels of rotary selector switches 70, 71, 72, 15 in FIGS. 1A, 1B, 1C, 1D, respectively, via an equipment selector relay provided for each query section.

More particularly, equipment selector, normally open, mechanically held, solenoid closed relay switches 73, 74, 75, 76, 77, 78, 79, 80, 81 are provided for query sections Q of sections A1, A2, A3, B1, B2, B3, C1, C2, C3. Each of the relay switches 73 through 81 are individually operated by a normally deenergized, grounded solenoid having an armature connected to a corresponding switch. The switches 73 through 81 are normally connected to a B− 48 volts direct current power source for respectively connecting the first level contacts of the equipment positions A1, A2, A3, B1, B2, B3, C1, C2, C3 to the B− power source. When a patch cord is connected into the A1 query section Q, the coil of the relay switch 73 is connected to the B+ voltage power source and the switch 73 is moved downwardly to a hold position contact so that its coil remains energized with B+ voltage.

The rotary selector switch 70, similar to the switch 15, has two control levels. The first control level of the LSM #1 switch 70 comprises nine contacts 85, 86, 87, 88, 89, 90, 91, 92, 93 adapted to be scanned by a contact arm 94 and respectively wired to the relay switches 73, 74, 75, 76, 77, 78, 79, 80, 81. The first control level of the LSM #2 rotary selector switch 71 comprises nine contacts 95, 96, 97, 98, 99, 100, 101, 102, 103 adapted to be scanned by a contact arm 104 and are respectively electrically connected to the switches 73, 74, 75, 76, 77, 78, 79, 80, 81. The first control level of the LSM #3 rotary selector switch 72 comprises nine contacts 105, 106, 107, 108, 109, 110, 111, 112, 113 adapted to be scanned by a contact arm 114 and are respectively wired to the relay switches 73, 74, 75, 76, 77, 78, 79, 80, 81.

The second of the two control levels of each selector switch 70, 71, 72 comprises a feedback arrangement wherein nine contacts 115, 116, 117, 118, 119, 120, 121, 122, 323 of the switch 70 are respectively electrically connected to nine corresponding contacts 123, 124, 125, 126, 127, 128, 129, 130, 131 of the switch 71 and nine contacts 132, 133, 134, 135, 136, 137, 138, 139, 140 of the switch 72 and are respectively adapted to be scanned by contact arms 141, 142, 143. A tenth contact referred to as a home contact 144, 145, 146 is respectively provided in the second feedback or control level of each of the switches 70, 71, 72. The purpose of the second level is to provide a B− voltage to override previously answered requests.

The A1 query position relay switch 73 is wired directly to the contacts 85, 95, 105 and 21 of all four selector switches 70, 71, 72, 15, as pointed out, and the first control level respectively presents wipers 94, 104, 114 and 31 with a field of B+ voltages when the patch cord is in the query holes of the patch panel A1. Alternatively, in the absence of a patch cord in the panel A1 the wipers 94, 104, 114, 31 are presented with a B− voltage. The wiper circuit is so polarized that the B− voltage is directed to the selector switches 70, 71, 72, 15 while the B+ voltage is directed to slow-release latching relays, there being provided three relays indicated generally by the reference numerals 147, 148, 149, for the LSM's #1, #2, #3, respectively, interconnected with the rotary selector switches 70, 71, 72.

The rotary selector switch 70 operates to sequentially connect the panel holes of computers A, B, C to LSM #1 by means of thirty-one levels in the switch 70 of which only one typical level is shown, in FIG. 1A. The switch 70 has a contact arm 150 adapted to scan nine contacts 151, 152, 153, 154, 155, 156, 157, 158, 159 respectively wired to the first set of holes or prepatch terminals in panels A1, A2, A3, B1, B2, B3, C1, C2, C3, of which there are thirty-one sets of holes in each of said panels over and above the usual pair of query terminals in each section Q. The contact arm 150 is wired to the terminals of LSM #1.

Similarly, the switch 71 has thirty-one levels of which only one typical level is shown, for servicing LSM #2. This typical level has a contact arm 160 adapted to sweep contacts 161, 162, 163, 164, 165, 166, 167, 168, 169 respectively wired to the first set of patch terminals in sections A1, A2, A3, B1, B2, B3, C1, C2, C3 of computers A, B, C. The other thirty sets of patch terminals are correspondingly serviced by an additional thirty selector switch levels. The contact arm 160 is wired to the terminals of LSM #2.

Referring to FIG. 1C, the selector switch 72 is likewise provided with thirty-one levels of which only one level is shown for servicing LSM #3. The switch 72 has a contact arm 170 wired to the terminals of LSM #3 and adapted to scan nine contacts 171, 172, 173, 174, 175, 176, 177, 178, 179 which are respectively connected to the first pair of patch terminals in sections A1, A2, A3, B1, B2, B3, C1, C2, C3. It will be understood that the thirty levels not shown in the switch 72 are respectively connected to the thirty patch terminals in each of the patch sections of computers A, B, C.

Also, the switches 70, 71, 72 each have indicator levels with contact arms 180, 181, 182 similar to the indicator level contact arm 64. The arms 180, 181, 182, 64 are all connected to the same lamp power supply for illuminating the corresponding LSM and alarm lamps on the maintenance console in FIG. 2. Similar to the selector switch 15 of FIG. 1D, the contact arm 180 is adapted to scan nine contacts 183, 184, 185, 186, 187, 188, 189, 190, 191 forming the indicator level of the switch 70 and respectively directly wired to the maintenance console lamps 14 of LSM #1 of panels A1, A2, A3, B1, B2, B3, C1, C2, C3, for showing where the LSM #1 is being used.

Similiarly, the indicator level contact arm 181 of the switch 71 is adapted to scan nine contacts 192, 193, 194, 195, 196, 197, 198, 199, 200 which are respectively wired to LSM #2 lamps 14 in the maintenance console panel sections A1, A2, A3, B1, B2, B3, C1, C2, C3 in FIG. 2.

Likewise, the indicator level contact arm 182 of the switch 72 is adapted to scan nine contacts 201, 202, 203, 204, 205, 206, 207, 208, 209, which are respectively wired to LSM #3 lamps 14 in the maintenance console panel sections A1, A2, A3, B1, B2, B3, C1, C2, C3 in FIG. 2.

Each of the contact arms 94, 141, 150, 180 of the selector switch 70 is fixed to a rotatable shaft means 210 adapted to be driven by a motion translating mechanism, not shown, when a solenoid coil 211 is energized. An off-normal switch 212 is adapted to be closed by a rotatable cam 213 fixed to the shaft means 210. An interrupter switch 214 is also adapted to be closed in a conventional manner upon energization of the solenoid coil 211, FIG. 1A.

Each of the contact arms 104, 142, 160, 181 is fixed to a rotatable shaft means 215 adapted to be driven by a motion translating mechanism, not shown, when a solenoid coil 216 is energized. An off-normal switch 217 is adapted to be closed by a rotatable cam 218 fixed to the shaft means 215. An interrupter switch 219 is adapted to be closed in a conventional manner upon energization of the solenoid coil 216, FIG. 1B.

Each of the contact arms 114, 143, 170, 182 of the selector switch 72, FIG. 1C, is fixed to a rotatable shaft means 220 adapted to be driven by a conventional motion translating mechanism, not shown, when a solenoid coil 221 is energized. An off-normal switch 222 is adapted to be closed by a rotatable cam 223 fixed to the shaft means 220. An interrupter switch 224 is adapted to be closed in a conventional manner upon energization of the solenoid coil 221.

In operation, the wipers 94, 104, 114, 31 scan the voltages at the first control level. A B− voltage indicative of no request will be passed while a B+ voltage indicative of a request will cause the switch 70, 71, 72, 15, that is being operated in a sequential manner to be described, to be stopped. When the switch is stopped, the thirty-one levels that switch the linear servo multiplier #1, #2, or #3 are connected to the position on the prepatch panel A1, A2, A3, B1, B2, B3, C1, C2, C3 where the query was initiated. At this time the indicator level on the selector switch 70, 71, 72 corresponding to the selected linear servo amplifier illuminates a lamp on the maintenance console, FIG. 2. This indicates that the selected computing element is now electrically connected to the position where it was requested. The purpose of the second control level is to provide a B− voltage of −48 v. D.C. to override previously answered B+ requests of +24 v. D.C. with the net overriding voltage being −24 v. D.C.

Each selector switch 70, 71, 72, 15 in scanning its first control level searches for a B+ voltage. Before responding to a B+ request, the first control level in effect checks with the second control feedback level to determine if the request is still valid. Should the B+ request have been answered with the selected computer component, the selector switch satisfying that request will have distributed a B− voltage to this position on the second level of all the selector switches 70, 71, 72, 15. This B− voltage then causes the scanning switch to step past the answered query and seek an unanswered query. If these is no request at any position, the selector switch will step to the home position wherein, depending upon the switch being operated, the contact arm 141, 142, 143 or 42 rests on home position contact 144, 145, 146 or 41, respectively.

With each selector switch 70, 71, 72, with the exception of the selector switch 15, there is the associated slow-release latching relay 147, 148, 149, respectively, as pointed out hereinabove. The purpose of these relays is to fix a routine method of answering requests and to retain the selections until they are released. This is done through interlocks arranged to allow only one selector switch 70, 71, 72, 15, respectively to scan at a time.

One pole of the latching relay interlocks its associated selector switch and disables the latter after its corresponding computing element has been allocated. Accordingly, the latching relay 147 has six mechanically held normally closed switches 224, 225, 226, 227, 228, 229 adapted to be opened by means of an armature 230 by energizing grounded relay coils 231, 232. Normally the relay switch 224 connects the interrupter switch 214 to the B− power source.

The relay switch 225 normally controls the common ground of relay coils 233, 234 of the latching relay 148.

The relay 148 has four normally closed mechanically held switches 235, 236, 237, 238 adapted to be closed or opened by an armature 239 by energizing the solenoid coils 233 or 234, respectively.

The closed latching relay switch 227, which is grounded, cooperates with the normally closed switch 236 of the relay 148 to provide solenoid coils 240, 241 of the latching relay 149 with a common ground. The relay 149 has two normally mechanically held switches 242, 243, adapted to be closed or opened by an armature 244 when the coils 240, 241 are energized, respectively.

The closed switch 235 connects the B− power supply to the interrupter switch 219 of the rotary selector switch 71 via a line 245, the interlock switch 226 of the relay 147, and a line 246. A diode 247 is connected in a line 248 across the lines 245 and 246 to conduct from the line 246 to the line 245.

Similarly, the switch 242 of the latching relay 149 connects the B− power supply to the interrupter switch 224 of the selector switch 72 via a line 250, closed latching relay interlock switch 237 of the relay 148, a line 251, a closed latching relay interlock switch 228 of the relay 147, and a line 252. A diode 253 in a line 254 is parallely connected across lines 252 and 250 to conduct from the line 252 to the line 250.

The interrupter switch 67 of the selector switch 15 is connected to its coil 66 by means of an interlock circuit comprising a line 255, the relay switch 229, a line 256, the switch 238, a line 257, the switch 243 when closed, and a line 258.

Figure 1D:
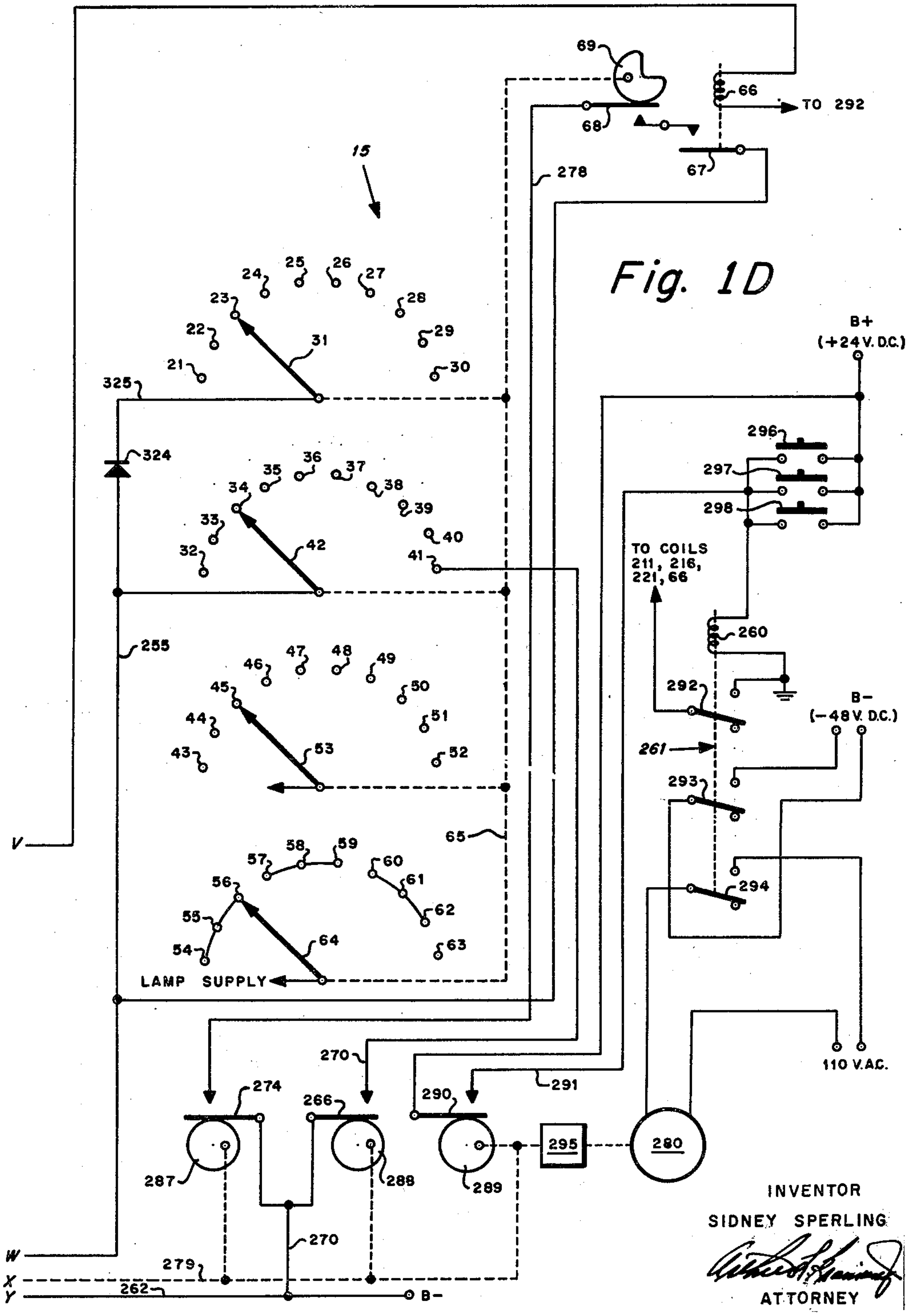

The coils 211, 216, 221, 66 of the rotary selector switches 70, 71, 72, 15 are all wired to a grounded relay switch 292 of a motor start and hold circuit's mechanically held normally open relay, indicated generally by the reference numeral 261, to be described, FIG. 1D. The relay 261 is operated by a coil 260.

As pointed out, the interlocks for the coils of the selector switches 71, 72, 15 and for the latching relays 148, 149 are arranged to allow only one selector switch to scan at one time. Switches 70, 71, 72 and 15 scan in that order.

One pole of each latching relay interlocks its associated selector switch and disables the latter after its corresponding computing element has been allocated. Switches 70, 71, 72, respectively operate to allocate linear servo mechanisms #1, #2, #3. Each latching relay 147, 148, 149 operates on a time interval of twice the time required to step a selector switch 70, 71, 72, 15 between successive terminals in the path of the respective wiping contact arms thereof. This time interval permits the selector switch which is currently performing its scanning function to step over a previously answered query for equipment.

The latching relays 147, 148, 149 are respectively energized by a pair of polarized solenoid coils 231 and 232, 233 and 234, 240 and 241. The solenoid coils 231, 233 and 240 respond to the B+ voltage and the solenoid coils 232, 234 and 241 respond to the B− voltage. Failure of power does not affect the latching relay positions as the contact switches thereof are of the transfer type, and since the relay switches latch in both open and closed positions no position changes occur as a result of power failure.

In the B− phase, the latching relays 147, 148, 149 respectively allow the associated selector switches 70, 71, 72 to function. At this time the associated homing circuit is interlocked out. Each selector switch 70, 71, 72 and 15 has a home position contact 144, 145, 146 and 41 adapted to be closed by second level control wiping arms 141, 142, 143, 42, respectively. Each home position contact 144, 145, 146 and 41 is adapted to be connected to the B— power supply line 262 via cam closable switches 263, 264, 265, 266 in feeder lines 267, 268, 269, 270.

The cam operated off-normal switches 212, 217, 222 and 68 of the selector switches 70, 71, 72, 15, respectively, are adapted to be connected to the B— power supply line 262 via cam closable switches 271, 272, 273, 274 in feeder lines 275, 276, 277, 278. A cam shaft 279 driven by an electric master-timer motor 280, referred to herein as a timer drive, rotates nine cams 281, 282, 283, 284, 285, 286, 287, 288, 289 for respectively closing the cam switches 271, 263, 272, 264, 273, 265, 174, 266 and a motor hold circuit cam switch 290. Closure of the cam switch 290 directly connects the hold circuit relay coil 260 to the +24 v. D.C. power supply via line 291 and causes the closure of relay switches 292, 293, 294. Closure of the switch 292 connects all of the rotary selector switch coils 211, 216, 221, 66 to ground. Closure of the switch 294 connects the motor 280 to an 110 volts alternating current power supply causing the motor 280 to rotate the cam shaft 279 via a conventional overload clutch 295. Closure of the switch 293 puts a primary winding of a transformer into circuit for providing the system with the B— 48 v. D.C. power supply.

The motor 280 is initially started by the manual closure of any one of three parallely connected select buttons 296, 297, 298 which connect the relay coil 260 to the B+ 24 v. D.C. power supply. The energization of the motor 280 causes the cam 289 to close the motor hold circuit switch 290. The motor 280 stops when the cam 289 makes one complete revolution and the switch 290 opens. Switches 296, 297, 298 are preferably conveniently located on computer panels A, B, C, respectively.

*Operation*

In order to make a store selection, a patch cord is plugged into the selected query prepatch panel A1, A2, A3, B1, B2, B3, C1, C2 or C3 of computer A, B or C. The most convenient select button 296, 297 or 298 is pressed and the relay coil 260 is energized. Accordingly, the relay switches 292, 293, 294 are closed. The contact 292 grounds the low side of the stepping solenoid coils 211, 216, 221, 66. The relay switch 294 causes the energization of the master timer motor 280. The relay switch 293 puts the B— power supply into circuit.

The master timer motor 280 rotates the cam shaft 279 on which are mounted the nine cams 281 through 289. The rotation of the cam 289 closes the associated switch 290 which causes the relay coil 260 to remain energized for one rotation of the cam shaft 279. At the completion of this rotation, the cam switch 290 opens and the coil 260 is deenergized, opening all the relay switches 292, 293, 294.

The purpose of the master timer is to initiate the stepping of each of the four selector switches 70, 71, 72, 15 in succession, until all the selector switches have started their cycles. Briefly, the cam 281 rotates, FIG. 1A, closes its associated switch 271, and if the relay coil 232 is energized, i.e., the slow release latching relay 147 is in the B— phase, current will flow through the off-normal switch 212. This will step the selector switch 70 causing the contact arms 94, 141, 150, 180 to be moved to the home position, of which only the home position 144 for the arm 141 is shown. Meanwhile, the cam 282 is rotating when the cam switch 263 is closed. A B— voltage is routed to the home position 144 on the second control level causing the selector switch coil 211 to be energized again, thus starting its scanning cycle. The timer will then allow an interval during which the selector switch 70 can step through its cycle, set up the latching relay 147, and permit the next succeeding latching relay 148 to be set up, FIG. 1B.

A typical timing sequence is as follows: B— pulse to home 144; time for the selector switch 70 to step home; B— pulse off at home; time to reset the latching relay 147 associated with the selector switch 70; and finally, time for the next latching relay 148 to set up. The master timer 280 will repeat this sequence once for each unit 70, 71, 72, 15, reset itself, and open the switch 290 holding the motor in circuit. Total elapsed time for equipment selection is six seconds.

By way of illustration, assume that the LSM #1 is in use at the prepatch panel C1, on the computer C, that the LSM #2 is in use at the prepatch panel C2 on the computer C, and that the LSM #3 is not in use. The system is then in the following condition:

(a) The computer C query holes in prepatch panels C1 and C2 are patched by patch cords 331, 332, FIG. 1C.

(b) The lamps 14 are lighted on the maintenance console at positions LSM #1, C1 and LSM #2, C2.

The selector switch 70 for LSM #1 is at position C1, i.e., contact arms 94, 141, 150, 180 are at contacts 91, 121, 157, 189, respectively, FIG. 1A.

(c) The latching relay 147 is in its B+ phase and all interlocks are closed, which means that the feedback C1, contact 121 of the selector switches 70 is at B—.

(d) The selector switch 71 is at C2 position, i.e., contact arms 104, 142, 160, 181 are at C2 contacts 102, 130, 168, 199, respectively.

(e) The latching relay 147 is in the B+ phase and the C2 contacts on the feedback levels of all selector switches are at B— voltage.

(f) The contact arms of the selector switch 72 are at their home positions, as shown in FIG. 1C.

(g) The latching relay 149 is in the B— phase and ready to step when all interlocks open.

(h) All of the contact arms of the alarm selector 15 are at their home positions.

(i) The cam switch 290 operated by the cam 289 is open and the timer is reset for another cycle.

It is now desired to have linear servo multipliers at prepatch panels A3 and B2 on the computers A and B, respectively. The corresponding query holes are patched with patch cords 333 and 334; and the following sequence of operation ensues.

One of the select buttons 296, 297, 298 is pressed. The relay coil 260 is energized and grounds the selector switch coils 211, 216, 221, 66 via the relay switch 292. At the same time the switch 294 is closed so as to cause the master timer motor 280 to be energized.

The cam shaft 279 rotates the cam 281, closing the cam operated switch 271, and cause the B— voltage to be conducted to the off-normal switch 212 on the selector switch 70 via line 275. Since the latching relay 147 is in the B+ phase, as shown in FIG. 1A, the selector switch 70 remains stationary.

The reason that the latching relay 147 is in the B+ phase is because the C1 patch cord 331 connects the C1 relay switch 79 to the B+ voltage and causes the switch 79, FIG. 1C, to remain closed. The latching relay coil 231 is energized by the B+ voltage via the switch 79, the line 303, the line 305 and the diode 304. The relay coil 231 is always grounded.

The cam shaft 279 continues to rotate and the cam 282 closes the switch 263, the B— voltage is then routed via the line 267 to the home contact 144 on the second control or feedback level of the selector switch 70. Since the feedback wiper arm 141 is not at the home position 144, the B— voltage is of no effect.

The timer repeats the above sequence for the LSM #2 selector switch 71. The latching relay 148 is in the B+ phase as shown in FIG. 1B. This prevents the B— voltage admitted by the rotation of the cams 283, 284 from affecting the position of the selector switch 71. The reason that the latching relay 148 is in the B+ phase is that the patch cord 332 has caused the C2 relay switch 80, FIG. 1C, to be closed and cause the B+ 24 v. D.C. voltage to energize the latching relay coil 233 via the first control level contact arm 104, line 309, line 313, and the diode 312. The coil 233 is grounded through the grounded interlock relay switch 225.

The LSM #3 latching relay 149, FIG. 1C, is in the B— phase because the LSM #3 is not in use, and accordingly, the first control level wiper arm 114 is on a dead contact. As the master timer cam shaft 279 rotates the switch 273 is closed by the cam 285 and a B— voltage appears at the off-normal switch 222 on the LSM #3 selector switch 72. This causes the LSM #3 selector switch relay coil 221 to be energized for stepping the LSM #3 selector switch contact arms 114, 143, 170, 182. At A1 contacts 105, 132, 171, 201 on the LSM #3 selector switch 72 there is a B— voltage due to the position of the A1 relay switch 73, FIG. 1A. This B— voltage steps the contact arms 114, 143, 170, 182 to the A2 contact positions 106, 133, 172, 202. The A2 contacts are also at B— voltage because of the position of the relay switch 74, FIG. 1A, and accordingly, the LSM #3 contact arms step to the A3 contact positions 107, 134, 173, 203. At the A3 contact position, the LSM #3 selector switch 72 finds a positive voltage due to the fact that the patch cord 333 has caused the relay switch 75 to close and connect all of the A3 positions to be connected to the B+ power supply. Therefore, there is no overriding B— or negative voltage on the feedback or second control level of the selector switch 72. Accordingly, the LSM #3 selector switch control arms 114, 143, 170, 182 stop at the A3 contacts 107, 134, 173, 203, respectively. This makes available the terminals of the linear servo multiplier #3 at the prepatch panel A3, FIG. 1A, as requested.

The indicator light 14 at position LSM #3, A3 on the maintenance console is illuminated via the contact 203 and the contact arm 182 of the LSM #3 selector switch 72.

The coil 240 of the LSM #3 latching relay 149 is connected to the B+ voltage via a circuit comprising the closed relay switch 75, the first control level contact 107, the corresponding contact arm 114, the line 317, the line 321 and the diode 320. The coil 240 is grounded via the interlock switches 236 and 227 when the latching relays 148 and 147 are in their B+ phase positions as respectively shown in FIGS. 1B and 1A.

After the latching relay 149 goes to the B+ phase, the relay switches 242, 243 are closed to respectively disable the selector switch 72 and to interlock the alarm selector switch 15. The closure of the relay switch 242 puts the selector switch coil 221 out of circuit.

The pool of three ten-card linear servo multipliers is now completely assigned so that any more queries such as the query at preselected panel B2 for this equipment causes the alarm circuit to function. The B2 query will only be answered with the illumination of the alarm light 5 on the panel B2 of the maintenance console in FIG. 2.

The alarm selector switch is accordingly put into operation by the master timer motor 280 rotating the cam shaft 279 and causing the cam 287 to close its switch 274 so that B— voltage flows through the switch 274 via the line 278 to the off-normal switch 68. But since the contact arm 42 is at the dead home position, contact 41, the stepper circuit is open and the alarm switch 15 does not step.

As the cam shaft 279 continues to rotate, the cam 288 closes the switch 266 and places a B— voltage at the home position 41, FIG. 1D, via the switch 266 and the line 270. The contact arm 42 conducts the B— voltage to the grounded alarm switch relay coil 66 via the line 255, the interlock switch 229, the line 256, the interlock switch 238, the line 257, the interlock switch 243 and the line 258 to the grounded relay coil 66. The contact arms of the alarm switch 15 then scan each contact position in succession until they reach the A3 contacts 23, 34, 45, 56.

At the first control level A3 contact 34 there is a B+ voltage because the relay switch 75 connects the contact 34 to the B+ voltage. However, there is an overriding B— voltage of 48 volts on the feedback control level contact 34 opposing the 24 volts B+ voltage conducted via the feedback contact arm 42, the diode 324, the line 325 to the first control level contact arm 32.

The control arms of the alarm selector 15 then proceed to the B1 position contacts 24, 35, 46, 57, there being a B— voltage on the first control level contact 24 because the B1 relay switch 76, FIG. 1B, connects the contact 24 to the B— power supply. This causes the stepper arm 31 to proceed to the B2 contact 25 where the voltage is positive because the B2 relay switch 77 connects the contact 25 to the B+ power supply, Since there is no overriding voltage at the B2 feedback level, the alarm selector 15 stops and signals an alarm to the lamp 11 of the computer B as well as to the alarm light 5 at the position B2 on the maintenance console in FIG. 2, respectively, via the contact arm 64 on the contact 58 and the contact arm 53 on the contact 47, as shown in FIG. 1D.

The master timer then resets the timer relay 261 and deenergizes its coil 260.

As pointed out, all three of the linear servo multipliers are in use and an alarm 5 in console panel B2 is indicated for the fourth and unanswerable request for a linear servo multiplier.

A practical application of the above system requires no modification of operating principles. The significant factor is the number and different types of equipment or stores in the pool. The three linear servo multipliers have been cited by way of illustrating the invention and is not to be considered as limiting the invention thereto.

It is to be understood that the present invention may be modified to adapt it to various circumstances and conditions, and it is accordingly desired to comprehend within the purview of this invention such modifications as may be considered to fall within the scope of the appended claims.

What is claimed is:

1. An automatic selector for pooled electrical analog computer components in a multiple computer installation for signaling the availability of a requested component at a prepatch panel comprising, a prepatch panel having a pair of query terminals and provided with the necessary number of electrical terminals for permitting the selected component to be suitably interconnected into the electrical analog computer being made up, selector switch means for each of the components, latching relay means controlling each of said selector switch means, means conducting an electrical query signal from said query terminals to each of said selector switch means, means for systematically interrogating each of said selector switch means in a predetermined order in response to said query signal, means for disabling each of said selector switch means that are in use and not available for assignment, and individual means for signalling when each selector switch is disabled.

2. An automatic selector for pooled electrical analog computer components in a multiple computer installation for signaling the availability of a requested component at a prepatch panel, comprising, a prepatch panel having a pair of query terminals and provided with the necessary number of electrical terminals for permitting the selected analog computer component to be suitably interconnected into the electrical analog computer being made up, selector switch means for each of the analog computer components, slow release latching relay means controlling each of said selector switch means, means conducting an electrical query signal from said query terminals to each of said selector switch means, means for systematically interrogating each of said selector switch means in a predetermined order in response to said query signal, means for disabling each of said selector switch means that are in use and not available for assignment, individual means for signaling when each of said selector switch means is disabled, and means for electrically connecting and making available an unassigned requested component at said equipment position panel where the query was initiated.

3. An automatic selector for pooled electrical analog computer components in a multiple computer installation for signaling the availability of a requested component at a prepatch panel comprising, a prepatch panel having a pair of query terminals, and provided with the necessary number of electrical terminals for permitting the selected analog computer component to be suitably interconnected into the electrical analog computer being made up, selector switch means for each of the analog computer components, a slow release latching relay means controlling each of said selector switch means, means for conducting an electrical query signal from said query terminals to each of said selector switch means, means for systematically interrogating each of said selector switch means in a predetermined order in response to said query signal, means for disabling each of said selector switch means that are in use and not available for assignment, individual means for signaling when each of said selector switch means is disabled, and maintenance console means having an indicator panel for each component identifying the portion of said prepatch panel to which components are assigned and requested, each of said selector switch means including indicator level contacts electrically connected to said component indicator panels, said indicator level contacts adapted to be scanned by contact arm means.

4. An automatic store inventory indicator apparatus for signaling the availability of each store and the positions to which each store has been requested or assigned, comprising, indicator panel means, selector switch means for each store, each of said selector switch means having relay means for the disablement thereof when the corresponding store has been assigned, alarm switch means having indicator level contact means electrically connected to said indicator panel means, said alarm switch means having contact arm means adapted to scan said indicator level contact means, means for conducting an electrical signal for requesting a store and querying the availability of such store, means for systematically interrogating each of said selector switch means in an orderly manner and assigning the first available store, means for signaling the assignment of said first available store, said interrogating means signaling said alarm switch means when no store has been found available for assignment, and means for signaling the position at which the store request was initiated when no store is found available.

5. An automatic selector for pooled electrical analog computer components in a multiple computer installation for either providing the electrical terminals of a requested analog computer component at a prepatch panel or signaling that the requested analog computer component is not available, comprising, a plurality of prepatch panel means each having a pair of query terminals and being provided with the necessary number of electrical terminals for permitting the selected analog computer component to be suitably interconnected into he computer being made up, alarm lamp means associated with each said prepatch panel means, discrete rotary selector switch means for each of the analog computer components, alarm switch means connected to said alarm lamp means, a slow release latching relay means controlling each of said rotary selector switch means, means for conducting an electrical query signal to each of said rotary selector switch means from a queried prepatch panel means, means for systematically interrogating each of said rotary selector switch means in a predetermined order, means for disabling each of said rotary selector switch means of each of the analog computer components that are assigned and not available, and means for electrically connecting and making available a selected analog computer component at the terminals of the prepatch panel at which each query signal has been initiated, and means for energizing said alarm lamp means associated with each of said prepatch panel means when the query signal initiated therefrom cannot be answered and the requested analog computer component cannot be provided at said queried prepatch panel means.

6. An automatic selector as set forth in claim 5, further comprising, interlock circuit means controlled by said relay means for putting the next selector switch means to be interrogated into circuit after the preceding selector switch means has been interrogated.

7. An automatic selector as set forth in claim 6, wherein said interrogating means comprises timer drive means cooperating with said interlock circuit means for systematically interrogating each of said selector switch means in an orderly manner and then signaling said alarm switch means when a request cannot be filled.

8. An automatic selector as set forth in claim 7, further comprising feedback circuit means for disabling any of said selector switch means remaining to be interrogated after a request has been filled.

9. An automatic selector as set forth in claim 8, further comprising maintenance console means having an indicator panel for each analog computer component for identifying the prepatch panel means to which the analog computer components are assigned and requested, each of said selector switch means including indicator level contacts electrically connected to said analog computer component indicator panels and said indicator level contacts being adapted to be scanned by contact arm means, and circuit means closable when said indicator level contact arm scans said indicator level contacts.

References Cited by the Examiner

UNITED STATES PATENTS

| | | | |
|---|---|---|---|
| 2,863,948 | 12/58 | Harris | 179—18.31 |
| 3,011,709 | 12/61 | Jacoby | 235—184 |
| 3,014,987 | 12/61 | Blackhall | 179—7.1 |

OTHER REFERENCES

Pages 365–376, 1951, "The Design of Switching Circuits," by W. Keister et al., Van Nostrand Co.

MALCOLM A. MORRISON, *Primary Examiner.*

IRVING L. SRAGOW, THOMAS B. HABECKER, *Examiners.*